INVENTORS.
Edward R. Sederlund
Grant W. Cheney
ATTORNEY

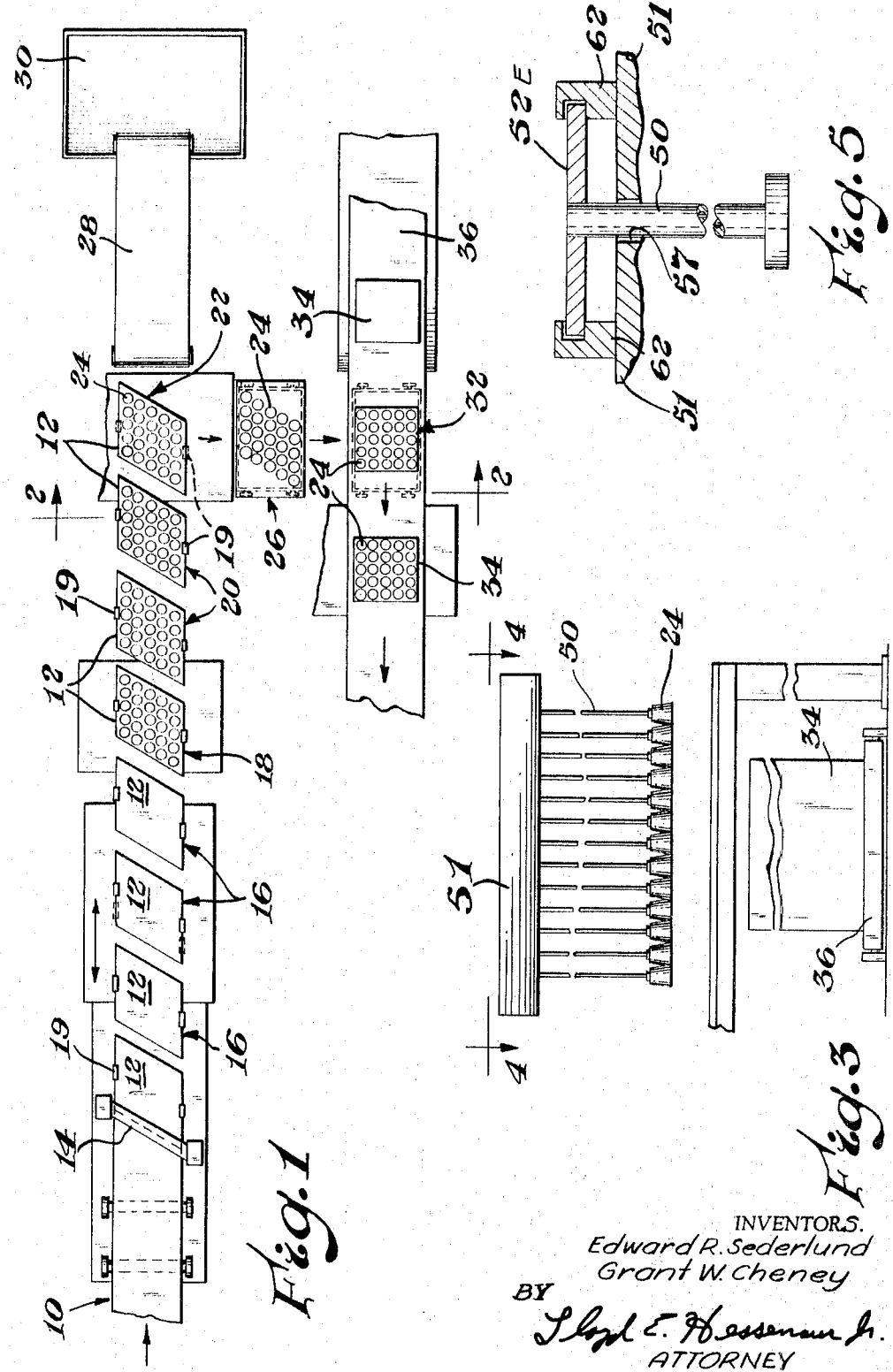

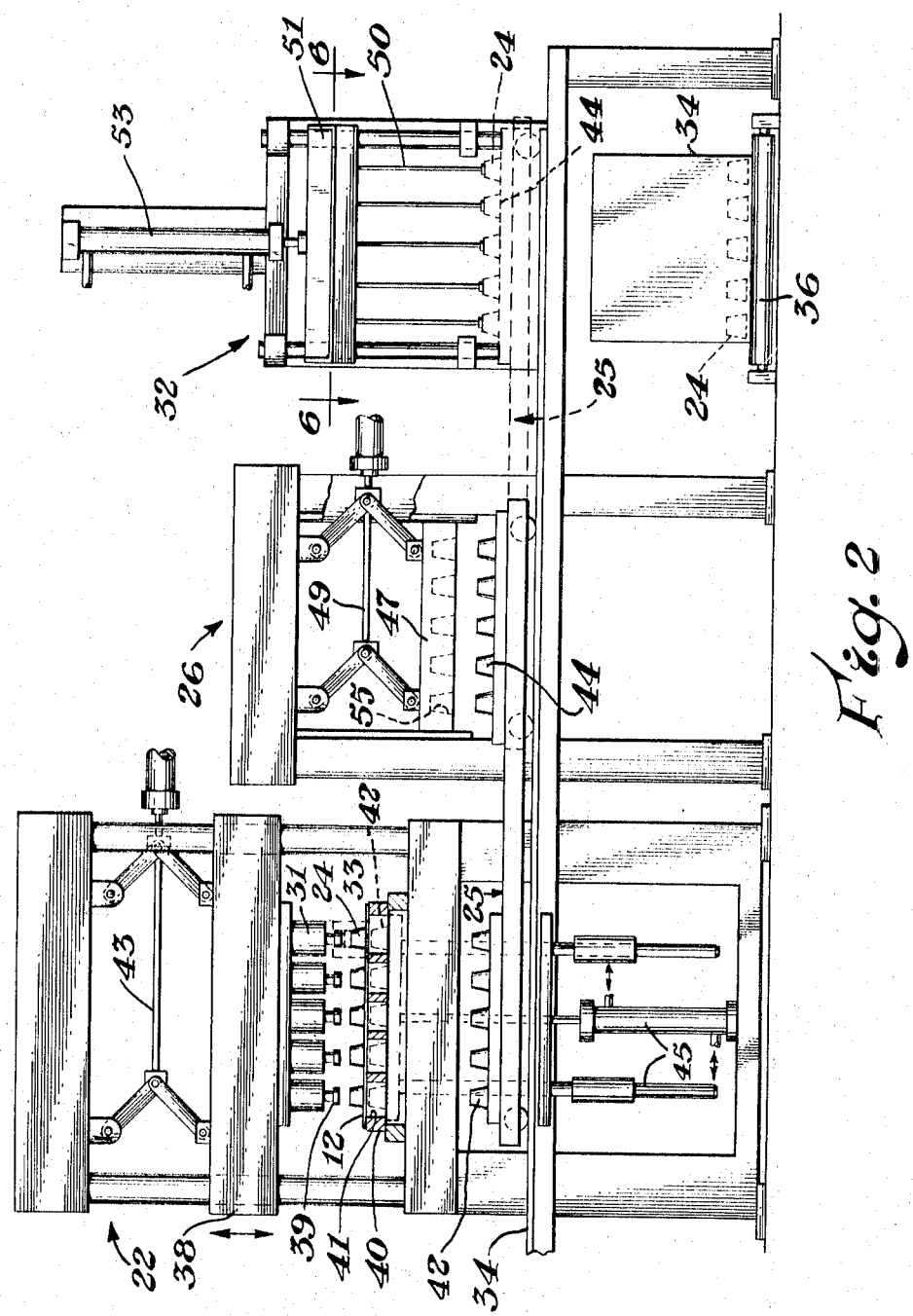

United States Patent Office 3,350,744
Patented Nov. 7, 1967

3,350,744
APPARATUS FOR FORMING CUPS, TUBS, LIDS AND THE LIKE
Edward R. Sederlund, Saginaw, Mich., and Grant W. Cheney, Lakewood, Ohio, assignors to The Dow Chemical Company, Midland, Mich., a corporation of Delaware
Filed Oct. 18, 1965, Ser. No. 497,254
6 Claims. (Cl. 18—19)

ABSTRACT OF THE DISCLOSURE

The invention comprises apparatus for forming cups, tubs, lids and the like from plastic sheet materials wherein the apparatus includes a plurality of stations, and for forming the articles in an arrangement such that their centers form the vertices of imaginary equilateral triangles in a sheet itself having a skewed parallelogram configuration, and a means for rearranging the articles from a skewed parallelogram pattern to a rectangular pattern to permit placing of the articles in a usual rectangular carton without manual handling. The apparatus further includes a novel shuttle type device to accomplish transfer of the articles from station to station after they are separated from the sheet material.

This invention relates generally to molding of cups, tubs, lids and the like from plastic sheet materials and, more particularly, to an automatic apparatus for the complete forming and packing for shipment of cups, tubs, lids and the like without manual handling. To simplify the disclosure of this invention, reference to the term cups shall also mean tubs, lids and the like wherever possible.

In prior apparatus for forming cups there has been a less than desirable efficiency in using of plastic sheet materials. The apparatus of the present invention overcomes the prior deficiencies by placing cups in an arrangement such that their centers form the verticies of imaginary equilateral triangles in a sheet, the sheet itself having a skewed parallelogram configuration.

Also prior to this invention, it had been customary to manually handle cups between the trimming, edge forming and packing steps. The present invention includes among other things a shuttle type device to accomplish this entire set of procedures without manual handling.

In furtherance of the aims of the invention, as set forth above, there is here further disclosed an apparatus for rearranging the cups from a skewed parallelogram pattern to a square or other rectangular pattern to permit placing of the cups in a usual rectangular carton without manual handling.

Yet additional objects and advantages of the present invention, and its numerous cognate benefits and features are even more apparent and manifest in and by the ensuing description taken in conjunction with the accompanying drawing in which, wheresoever possible, like characters of reference designate corresponding material and parts throughout the several views thereof, and in which:

FIGURE 1 is a schematic plan view of an automated cup forming line arranged according to the principles of the present invention;

FIGURE 2 is an enlarged elevational view thereof taken along the line 2—2 of FIGURE 1;

FIGURE 3 is an elevational view of the loading station at the right hand end of FIGURE 2 prior to squaring of the cup centers;

FIGURE 5 is a greatly enlarged cross-sectional view taken along line 5—5 of FIGURE 4.

Figure 4:
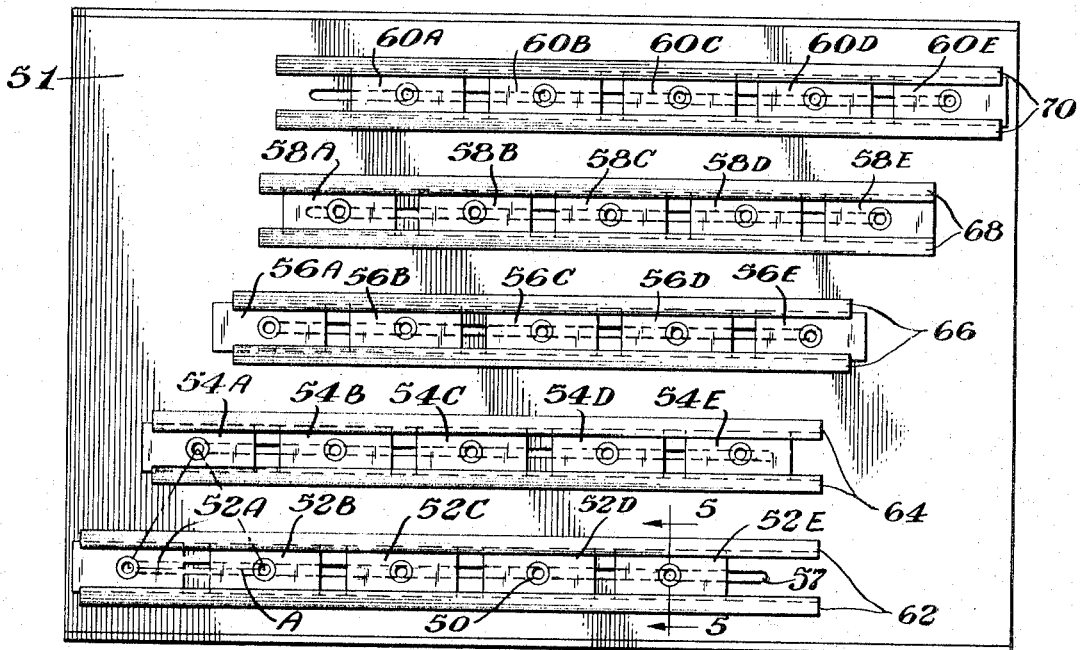
FIGURE 4 is a greatly enlarged plan view of the apparatus of FIGURE 3 as seen from the direction 4—4 of FIGURE 3.

Referring now more particularly to FIGURE 1, stock sheet thermoplastic material 10, such as high impact polystyrene and foam polystyrene, for example, travels in a direction (indicated by the arrow) from the left to the right of FIGURE 1 and is sheared into separate segments or sheet sections 12 by a cutter 14. The cutter shears the stock material 10 at an acute angle (which can be about 60°, for example) with respect to the flow of the stock material to divide it into a plurality of skewed parallelogram configurations. The sheared sections 12 travel through a plurality of heating stations 16 and into a station including mold press 18, by way of reciprocating side clamps 19. At the mold press 18 there is formed by conventional die molds (not shown) a plurality of generally cup-shaped configurations in each section 12, and still joined therewith. Each section 12 subsequently moves, through employment of clamps 19, through dwell stations 20 to a trimming station including trim press 22. At the trim press 22 each container or cup 24 is separated from the section 12 by conventional die punchers and placed on a cart 25 and shuttled to a rim forming station including rim forming press 26. The scrap which remains of each section 12 is carried by conveyor 28 into a scrap bin 30 for later disposal. From the rim forming press 26, the cups 24 are transported by cart 25 to an unloading or packing station 32 wherein they are rearranged and dropped into cartons 34 which travel on conveyor belt 36. Cups are stacked in the cartons until the cartons are full, full cartons being removed from the conveyor belt 36 for later storage and shipment.

From more detailed FIGURE 2, it can be seen that the trim press 22, rim forming press 26, and unloading station 32 are tied together by a rail 34 upon which cart 25 travels. The trim press 22 employs a movable die 38 which carries punches 31 and vacuum rods 39, which rods are slidable upwardly within a cup-shaped cavity 33 (shown in phantom as one punch 31 in its lowermost position, for illustrative purposes). The punches 31 move downwardly against facing die 40 which shears each cup 24 from sheet 12, the vacuum rods 39 then holding the bottoms of cups and lowering them through opening 41 unto holding mandrels 42 (shown in their raised position in phantom). The holding mandrels 42 then are lowered into the left hand side of cart 25, the holding mandrels being in a set of twenty-five to correspond to the number of cups 24 separated from each sheet 12. The die 38 and holding mandrels 25 are raised and lowered by conventional linkage and hydraulic arrangements 43 and 45, respectively. Once located on a holding mandrel 42, each cup 24 is transported or shuttled by the cart 25 to the right, as viewed in FIGURE 2, to the rim forming press 26. In this regard, cart 25 spans the length of trim press 22 and rim forming press 26, or rim forming press 26 and unloading station 32, as the case may be, the rim forming press 26 being the same distance from trim press 22 and unloading station 32. At the right hand end of cart 25 is a set of twenty-five curling mandrels 44, which are much like holding mandrels 42 only include a configuration to curl a rim in cooperation with the rest of rim forming press 26. In the position shown by solid lines in FIGURE 2, cart 25 is located such that the holding mandrels 42 are located beneath trim press 22 and the curling mandrels 44 are located beneath the rim forming press 24. In the position shown in phantom lines in FIG- URE 2, the holding mandrels 42 are located beneath the rim forming press 26 and the curling mandrels are located within unloading station 32. The cart 25 can shuttle back and forth between these two positions.

In operation then, once the cups 24 are placed on holding mandrels 42 under trim press 22, the cart shuttles to the right indexing the cups under the rim forming press 26. The cups 24 are then picked off of holding mandrels 42 by curling and heating mold 47 which descends thereover (through hydraulically operated linkage mechanism 49) and secures the cups by vacuum (vacuum parts not shown) in cup-shaped cavities 55 of mold 47. Mold 47 then rises lifting cups 24 from holding mandrels 42 and, while rising, heats the rims of the cups to a forming temperature. Likewise, at this time the cart 25 is shuttled to the left bringing empty holding mandrels 42 under trim press 22 to pick up another load of cups, and curling mandrels 44 thus likewise being brought under the rim forming press 26 by this movement of cart 25. With the cart 25 in this position, the mold 47 descends with heated cups 24 upon curling mandrels 44, which cavities 55 and curling mandrels 44 are cooperatively designed to effect a rim rolling of the cups in a conventional fashion, such as shown in U.S. Patent 3,011,212, for example. The vacuum is released by mold 47 and it then retreats upwardly leaving the finished cups upon the curling mandrels 44.

With the finished cups 24 on curling mandrels 44, cart 25 shuttles to the right into unloading station 32 and, at the same time, carries the next set of unfinished cups 24 located on the holding mandrels 42 beneath rim forming press 26. The finished cups 24 are picked up by vacuum pick-up rods 50, the rods being slidable in slots 57 of frame 51 which itself is movable vertically via hydraulic mechanism 53. The rods 50 are lowered until they contact the bottom of finished cups 24, then raised with these cups secured thereto, leaving the curling mandrels empty and free to return to rim forming press 26 to pick up and form rims on the next set of cups. When the cart 25 indexes to the left to accomplish this purpose the space below the rods 50 is then left open.

Since the rods 50, to pick-up the cups 24 from curling mandrels 44, are in a skewed parallelogram arrangement, they are subsequently squared, as described in some detail hereinafter, the rods 50 then lowering the squared arrangement of cups 24 into a carton 34, each set of finished cups 24 forming one layer of a stack of layers of cups. This procedure is repeated until a carton 34 is filled, which carton then travels along conveyor belt 36 out from under unloading station 32 and is replaced by an empty carton 34.

In the above arrangement it can be seen that the holding mandrels 42 are always holding cups when indexed to the right as shown, and empty when indexed to the left.

Figure 6:
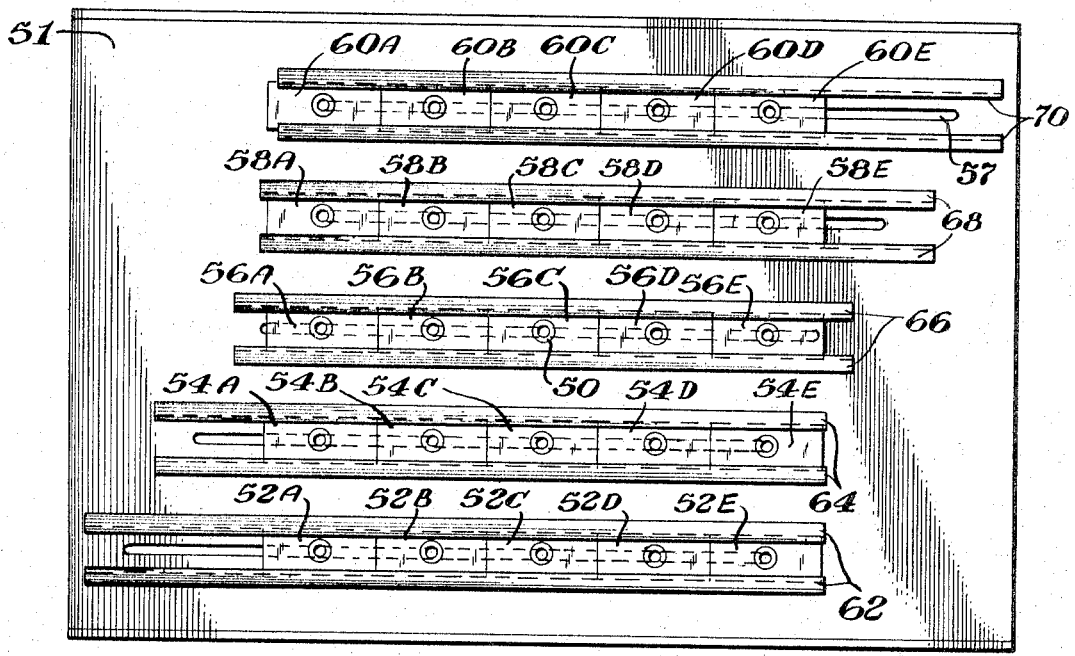
FIGURE 6 is a greatly enlarged plan view like FIGURE 4 only as seen from the direction 6—6 of FIGURE 2.

FIGURES 5 to 7 illustrate in greater detail the biasing arrangement whereby highly efficient sheet material utilization can be achieved. In the earlier description of FIGURE 1, it was briefly noted that the sections 12 are formed in a parallelogram having an opposed angularity of about 60°. This particular embodiment shows that twenty-five cups are formed out of each sheet section 12, the cups also defining a parallelogram of the same angular disposition. FIGURE 3 illustrates an elevational view of this arrangement. A plan view thereof, as seen from FIGURE 4, illustrates the head of each rod 50, which rods are located in laterally movable plates 52A–52E, 54A–54E, 56A–56E, 58A–58E and 60A–60E. These plates travel in channels 62–70, as described hereinafter and illustrated in FIGURE 5. The rods 50 and plates 52–60, and thus the cups 24 carried thereby, are all in the skewed parallelogram arrangement, presenting the centers of the cups 24 such that they are located at the verticies of imaginary equilateral triangles, such as triangle A. By such an arrangement a minimum quantity of scrap material results from each section 12 of the stock 10. It is in this angular relationship that all of the operations of the apparatus take place up until the unloading station 32 is reached. At this point, the rods 50 carrying the cups are shifted from the parallelogram to a rectangular or squared arrangement, the latter as illustrated in FIGURES 2 and 6. To achieve the necessary shift, each of the rods 50 can be carried by a plate 52 for sliding travel back and forth along opposed pairs of channels 62–70 provided for each row of plates 52 with the exception of center plate 56C which remains stationary. Each pair of channels 62, 64, 68 and 70 is also movable with respect to one another and stationary channel 66 in directions at right angles to those of the plates 52. Thus, center plate 56C and middle channel 66 remain stationary both in the parallelogram and rectangular arrangements of the rods 50. The plates 52 can be moved within the channels by any conventional linkage mechanism, such as might be motivated by hydraulic pistons or other well-known actuating apparatus and the like (not shown). Comparing FIGURE 4 with FIGURE 6 it can be seen that the rods 50 form a rectangular pattern by moving of the plates 52 laterally toward, laterally away from, or in alignment with center plate 56C. Likewise, to achieve the necessary squaring effect, the channels 62, 64, 68 and 70 close upon middle channel 66. The effect, as stated earlier, is to square the cups to permit stacking thereof in a rectangular carton while yet achieving maximum utilization of the sheet material feed to the apparatus.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. An apparatus for forming cups, tubs, lids and like articles, comprising a plurality of in-line stations performing sequential handling and forming operation; means for supplying a stock of sheet material into said apparatus adjacent one of its ends; a shearing means for separating said sheet material into a plurality of sections each having a skewed parallelogram configuration; a heating station; a molding station including means for forming articles in each said section such that the centers of the articles are at vertices of imaginary equilateral triangles and define a skewed parallelogram configuration; a trimming station; all of the aforesaid stations located in-line one after the other; a first means for moving each section sequentially from one station to the next in order; a rim-forming station and an unloading station located in-line with and beyond said trimming station; a second means for moving the articles after they are separated from their respective section to the rim-forming station and unloading station; said unloading station including a pickup rod for each article and means in combination with said pickup rods for removing each said article from said second means in the skewed arrangement thereof and for shifting said pickup rods to a rectangular arrangement of a length and width substantially that of a shipping carton in which such articles are to be placed and for lowering said pickup rods with the articles thereon into such carton.

2. The apparatus of claim 1 wherein said rim forming station is equally spaced from said trimming station and said unloading station, all three stations being of substantially the same length in-line, said second means substantially spanning the distance from the end of the trimming station remote from the rim forming station to the end of the rim forming station remote from said trimming station, holding mandrels located in the trimming station on said second means, curling mandrels located in the rim forming station on said second means, each of said holding and curling mandrels adapted to receive one of said articles.

3. The apparatus of claim 2 wherein said trimming station and rim forming station and unloading station are tied together by rails, said second means including a cart travable on said rails and carrying said holding and curling mandrels, the extent of said rails being sufficient to permit said mandrels to be located in said stations, and means to shuttle said cart laterally back and forth between said stations.

4. An apparatus for forming cups, tubs, lids and like articles comprising means for supplying a continuous stock of thermoplastic sheet material into said apparatus, a shearing means for separating said sheet material into sections at an acute angle to the length thereof to define skewed parallelogram configurations, molding dies for forming articles from each said section, said molding dies located such that the centers of adjacent groups of three are at the verticies of imaginary equilateral triangles, and means for removing said articles from each said section and squaring the articles for unloading into shipping cartons.

5. An apparatus for forming cups, tubs, lids and like articles comprising a plurality of in-line stations performing sequential handling and forming operations, at least one of said stations located an equal distance from stations fore and aft thereof, each of said stations being of a substantially equal in-line length, a means for carrying articles from one station to the other and extending the length of two stations and the distance therebetween, mandrels adjacent opposite in-line extremities of said carrying means each sufficient to carry a set of said articles, and actuating means for shuttling said carrying means fore and aft a distance substantially equal to the length of one station and the length between said stations.

6. The apapratus of claim 5 wherein said carrying means comprises a cart traveling on rails extending the in-line distance through said stations.

References Cited

UNITED STATES PATENTS

| | | | |
|---|---|---|---|
| 1,879,555 | 9/1932 | Simmons | 18—19 |
| 1,948,344 | 2/1934 | Fischer | 18—4 |
| 2,120,328 | 6/1958 | Ferngren | 18—19 X |
| 2,921,336 | 1/1960 | Crafton | 18—4 |
| 3,078,506 | 2/1963 | Caughey | 18—4 |
| 3,115,677 | 12/1963 | Thiel | 18—19 X |
| 3,237,242 | 1/1966 | Cerletz | 18—4 |
| 3,238,566 | 3/1966 | Kochler | 18—19 |
| 3,240,851 | 3/1966 | Scalora | 18—19 X |
| 3,277,224 | 10/1966 | Whiteford | 18—19 X |

WILLIAM J. STEPHENSON, *Primary Examiner.*